Patented Mar. 9, 1943

2,313,697

UNITED STATES PATENT OFFICE 2,313,697

MOLDING COMPOSITION

John W. Juppenlatz, Easton, Pa., assignor to Treadwell Engineering Company, Easton, Pa., a corporation of Pennsylvania No Drawing. Application September 7, 1939, Serial No. 293,852

10 Claims. (Cl. 22—188)

This invention relates to molding compositions, and particularly to compositions used in making molds in the manufacture of ferrous or nonferrous castings in sand molds and other materials, such compositions comprising, generally, a finely divided silicious or other heat resisting material, commonly referred to as sand, a binder, and a moistening agent.

Synthetic molding compositions are frequently employed, and the term "molding sand" as used herein is intended to include all naturally bonded and synthetic materials used for the stated purpose and commonly known as molding sands.

In late years synthetic molding sands have come into widespread use. These synthetic molding sands have the disadvantage that they dry out very readily, which characteristic presents problems during molding operations. One disadvantage resulting from rapid drying out is that molds, during molding operations such as finishing the molds or patching, require a water spraying on the surface which often produces defective castings. Another disadvantage resulting from excessive drying out of synthetic molding sands is that the molds, upon standing in the green state, lose the binding properties on the surface, with the result that castings made in such molds are frequently "dirty." To prevent the excessively rapid drying out of sand molds, molding sands have been moistened with water and oils, such as fuel oil, or glycerin solutions, etc., with a reasonable degree of success. However, petroleum oils do not possess binding properties and, when the moisture leaves the sand, the strength of the mold is considerably lowered, as only the oil remains.

Oxidizing oils, such as linseed oil, have been used, and these oils impart strength to the mold, after the moisture has left the sand, by reason of the oxidization of the oils. However, linseed and other oxidizing oils are relatively expensive and sands containing such cannot be stored but must be used freshly mixed.

It is a principal object of the present invention to provide a molding composition including a moistening agent of such a nature as to increase the exposed surface drying time, and therefore overcome the disadvantage resulting from excessively rapid surface drying of the molds.

A further object is the provision of a molding composition including a moistening agent which is quickly and easily mixed with sand and which permits easier molding and ramming operations, since the sand, whether naturally bonded or synthetic, does not tend to lump or ball-up as much as when it is mixed with plain water or other moistening agents. Due to the softer texture and increased resilience of the molding composition of the present invention, pockets are rammed more smoothly and evenly, thus enhancing the production of molds and castings true to pattern.

The molding composition of the present invention possesses an increased surface drying time, facilitating patching and finishing of the mold; also because the mold surface retains moisture for a longer period of time than is the case with other molding compositions, the strength of the mold is retained, especially around exposed corners, etc., which ordinarily dry out rapidly. As a result of the surface moisture retention, molds made with molding compositions of the present invention have greater surface strength, resulting in cleaner castings.

Another object of the present invention is the provision of a molding composition including a moistening agent of great penetration and spreading qualities, which enables the mold to more readily absorb mold wash, thus closing the pores of the mold and preventing metal penetration.

The moistening agent of the present invention assists in developing greater adhesive dry strength of clays, binders and bentonite without an increase of green strength or in the moistened condition.

With these and other objects in view, the present invention consists in a molding composition comprising a natural or a synthetic molding sand with or without a binder, and a moistening agent consisting of an aqueous solution of a compound of the type which is frequently termed a "wetting agent" and which has a high penetrating power in aqueous solutions and creates great surface activity, lowering the interfacial or surface tension. The following groups of compounds illustrate some wetting agents which may be used:

Alkali salts of aliphatic alcohol sulphates, acid amides, or acid esters.

Alkali salts of aliphatic alcohol sulphonates, acid amides, or acid esters.

Alkali salts of aliphatic or aromatic secondary alcohol sulphates.

Alkali salts of aliphatic or aromatic secondary alcohol sulphonates.

Alkali salts of alkyl aryl sulphates.

Alkali salts of alkyl aryl sulphonates.

Many "wetting agents" are known, and the list is constantly expanding, and it is not intended to limit the scope of the present invention to the compounds mentioned above or their related compounds. A large number of compounds having a surface tension lowering effect are capable of producing the desired results to a greater or lesser extent. The wetting agent known commercially as "Tergitol 4" and having the formula $R_2CHSO_4Na$, where R represents a primary or secondary alkyl group, has been found to be particularly effective.

It is preferred to employ these "wetting agents" in aqueous solutions, in concentrations of 0.01% to 5.0% and the best results, to date, have been obtained by the use of a concentration of 0.25% to 0.50%.

The figures of concentration as set forth are based upon the amount of aqueous solution added to the molding sand and 1% of moisture present in the sand by weight is equivalent to 0.005% of compound when using an aqueous solution of 0.50% concentration.

The amount of "wetting agent" is small and a convenient method of introduction to the molding sand is by aqueous solution. However, the method of introduction of the "wetting agent" is incidental and need not be confined to the method as set forth but may be introduced into the ingredients forming a part of the molding composition.

Having thus described the invention, what is claimed as new and desired to be secured by Letters Patent is:

1. A sand-mold-forming composition for use in the preparation of molds for sand castings, comprising molding sand and an aqueous solution containing from 0.01% to 5.0% of a wetting agent.

2. A sand-mold-forming composition for use in the preparation of molds for sand castings, comprising molding sand and an aqueous solution of a compound selected from the group consisting of the alkali metal sulphates of aliphatic alcohol, aliphatic acid amides, aliphatic acid esters, aromatic secondary alcohols and alkyl aryl compounds.

3. A sand-mold-forming composition for use in the preparation of molds for sand castings, comprising molding sand and an aqueous solution of an alkali metal sulphate having the property of lowering the surface tension of said solution.

4. A sand-mold-forming composition for use in the preparation of molds for sand castings, comprising molding sand and an aqueous solution of an alkali metal sulphonate having the property of lowering the surface tension of said solution.

5. A sand-mold-forming composition for use in the preparation of molds for sand castings, comprising molding sand and an aqueous solution containing 0.01% to 5.0% of an alkali metal salt of an aliphatic alcohol sulphate.

6. A sand-mold-forming composition for use in the preparation of molds for sand castings, comprising molding sand and an aqueous solution containing 0.01% to 5.0% of an alkali metal salt of an aliphatic alcohol sulphonate.

7. A sand-mold-forming composition for use in the preparation of molds for sand castings, comprising molding sand and an aqueous solution containing 0.01% to 5.0% of an alkali metal salt of an alkyl aryl sulphate.

8. A sand-mold-forming composition for use in the preparation of molds for sand castings, comprising molding sand and an aqueous solution of a sodium secondary-alkyl sulphate, having the formula $R_2CHSO_4Na$, in which R represents a primary or secondary alkyl group.

9. A sand mold forming composition for use in the preparation of molds for sand castings, comprising molding sand and an aqueous solution of a compound selected from the group consisting of the alkali metal sulphonates of aliphatic alcohol, aliphatic acid amides, aliphatic acid esters, aromatic secondary alcohols, and alkyl aryl compounds.

10. A sand-mold-forming composition for use in the preparation of molds for sand castings, comprising molding sand and a moistening agent, said moistening agent consisting of an aqueous solution of a wetting agent.

JOHN W. JUPPENLATZ.